D. D. GREGORY.
Bank-Check.
No. 217,478. Patented July 15, 1879.
Fig: 1.
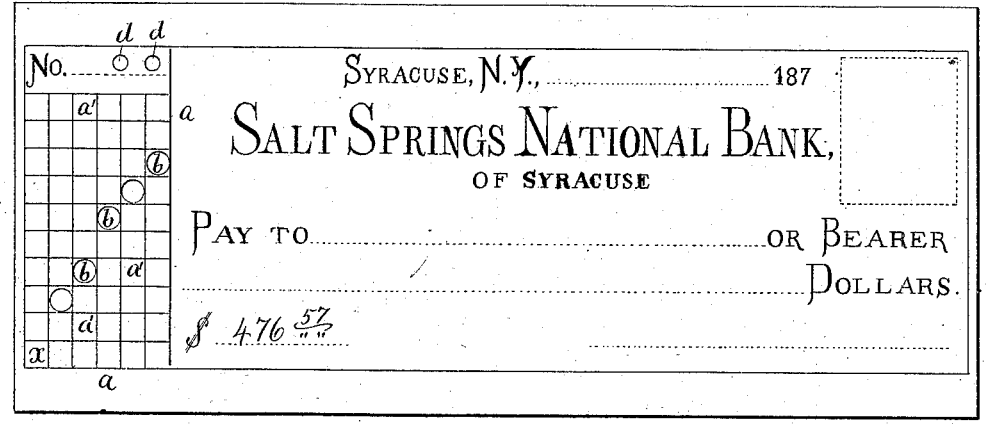
Fig: 2.
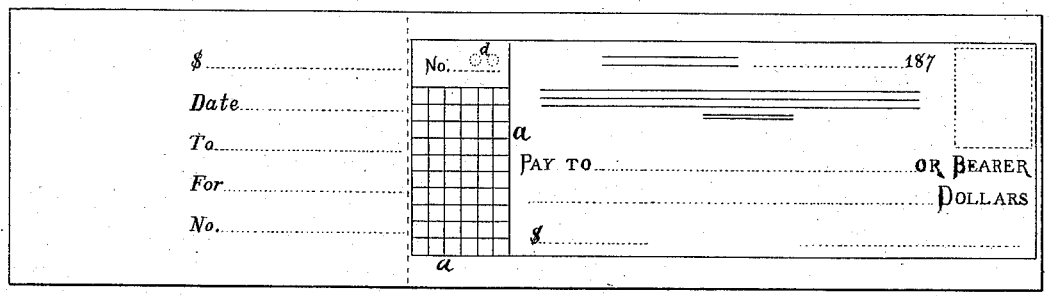
Fig: 4
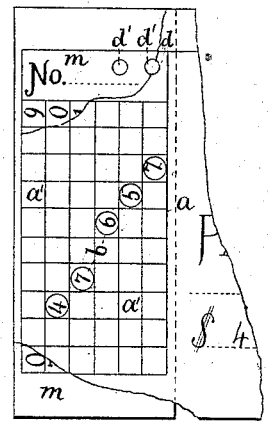
Fig: 3.
Witnesses.
Inventor.
David D. Gregory
by Crosby Gregory Atty

UNITED STATES PATENT OFFICE.

DAVID D. GREGORY, OF SYRACUSE, NEW YORK.

IMPROVEMENT IN BANK-CHECKS.

Specification forming part of Letters Patent No. 217,478, dated July 15, 1879; application filed May 16, 1879.

*To all whom it may concern:*

Be it known that I, DAVID D. GREGORY, of Syracuse, county of Onondaga, State of New York, have invented an Improvement in Bank-Checks, of which the following description, in connection with the accompanying drawings, is a specification.

My invention relates to bank-checks or other monetary instruments, and has for its object to detect any attempt to raise, alter, or forge the same. This I do by marking in any suitable way, preferably by punching, certain points in the check, so that when the check is properly placed upon a key, consisting of a series of arbitrarily-arranged figures, the marks of the check will coincide with those figures on the key which represent the amount for which the check is drawn.

Checks have previously been made provided with a series of figures from which the ones corresponding to the amount of the check may be punched, to thereby protect the check to a certain extent from being raised; but, as in these checks the arrangement of the figures and method of drawing the check are plain to every one, no protection is afforded against forging a complete check or refilling the holes and repunching to alter the check, as is sometimes done.

One way of carrying out my invention is to provide the check with a detecter or portion of suitable size or outline to register or correspond in size with a key, the detecter being preferably laid out to present small squares, or their equivalents, ten in number in one direction and six or any other convenient number in the other direction.

The key, which is preferably of thin sheet metal, but may be of paper, card, or any suitable material, has a series of figures upon it corresponding exactly in position with the squares marked on the check, each row of ten figures containing the ten figures from 0 to 9, the said figures being, however, arranged arbitrarily instead of regularly or in sequence, the different rows corresponding with the different places of decimals in the amount called for by the check. These rows are herein shown arranged regularly with the lowest decimal place, representing cents on the right, and the highest, representing thousands of dollars, if six rows are used, on the left.

For convenience the key may be provided with small holes near each figure, corresponding in position with the figures, so that the key may be laid upon the check or its detecter portion, to enable the check to be pricked or marked opposite such of the arbitrarily-arranged figures of the key as correspond with the amount for which the check is drawn, the said pricked portion indicating where the said check or its detecter portion is to be punched in order to leave spaces opposite those figures of the key which are called into requisition or selected to accord with the amount of the check or bill of exchange, the said holes so punched through the check or its detecter portion affording sight-holes or a ready means by which a paying-teller or other person may, by placing the punched part of the detecter over the key, see the figures, and only those figures, used in designating the amount of the check. It will be convenient to add two registering-holes in a part of the key unoccupied by the figures, to enable the check to be readily fitted in proper position upon the key by means of holes punched therein, to correspond with the said registering-holes.

The position of these registering-holes may be indicated by printing when a printed indicator portion is used with the check, in which case they need not appear on the key used by the issuer of the check, but must be shown either as marked or punched spots upon the copy of the key used by the payer of the check.

Figure 1 shows one of my improved checks punched to agree with the amount indicated upon its face. Fig. 2 shows a check attached to a stub, as in a check-book. Fig. 3 shows the key in accordance with which the check shown in Fig. 1 was punched; and Fig. 4 shows the bank or payer's copy of the key, provided with registering-holes, and having a portion of the punched check shown in Fig. 1 laid in position thereon.

The check is provided with a portion, *a*. (Shown marked off into squares *a'*, which correspond in position with the figures on the key in Fig. 3.)

The holes *b* are punched to correspond with the figures (shown in Fig. 4, and surrounded by dotted circles $b'$ in Fig. 3) on the key, which are the same as those of the amount for which the check is to be drawn—namely, in this case, 476.57. In this case the lowest decimal place—namely, that indicating cents—is on the right in Fig. 1, and at the bottom in Fig. 3, the key being turned quarter around.

The space $x$, representing the figure 0, (shown at $x'$, Fig. 3,) for the higher decimal place than those used on the check, may be punched, thereby precluding the possibility of a person improperly possessed of the key punching from that part of the check a figure greater than zero without refilling the original zero-hole.

The key, Fig. 3, consisting of figures arranged, as shown, in positions corresponding with the squares at $a$, (some of which are marked $a'$,) is shown as provided with small holes $c$, through which to indicate the places to be punched on the check. It is obvious, however, that the check may be correctly, but not so readily, punched without these holes by merely referring to the key. A copy of the key shown at $m$, Fig. 4, is kept at the bank, and by laying the punched check in register with this copy of the key, or in proper position upon it, as shown by the coincidence of the registering-holes $d$, Fig. 1, with those marked $d'$, Fig. 4, only the figures corresponding to the punched holes will show as in Fig. 4, the others being covered by the unpunched portion of the check, and these figures so exhibited through the holes will enable a person to see in the most expeditious manner possible if the figures opposite the holes correspond with the figures of the check, and if so the check may be considered verified; but should the figures exhibited through the holes not correspond with the figures of the check, then the check would be false.

Each business-house may have its own key, the figures being arranged in any arbitrary way, the copies being kept in suitable form at the bank, and, there being so many figures to arrange, there would be little, if any, chance of two business-houses making keys alike.

It is obvious that the verification of the check depends solely on the position of the holes in the punched part or detecter portion of the check, and that any form of key may be used provided with arbitrarily-arranged figures, and holes or any form of marks may be used on any part of the check to indicate its amount, the said marks coinciding in position with those figures of the key which represent the amount of the check when the check is placed upon the key or the bank or payer's copy thereof in proper position, as shown by the registering-holes or their equivalents.

Instead of punching two round holes in the check for the register-points, it is obvious that a single square or oblong or other than circular-shaped hole, as a cross or star, might be used, and, by taking special trouble in separating the checks from their stubs, the square corners of the check itself might be used as the register between it and the key; and, having described several forms or plans by which to assure the registering or correct placing of the check and key together, I desire it to be understood that the particular plans adopted for registering the check and key are not essential.

I claim—

1. A check or other monetary instrument having punch-holes which are arranged in accordance with and adapted to co-operate with an arbitrary key to express values, through which punch-holes the value of the check is read and its genuineness or fraudulence determined by the appearance in said holes of the figures upon the key when said check is properly adjusted upon said key, substantially as specified.

2. A key consisting of rows of arbitrarily-arranged figures, provided with holes corresponding in position with the figures, as and for the purpose described.

In testimony whereof I have signed my name to this specification in the presence of two subscribing witnesses.

DAVID D. GREGORY.

Witnesses:
G. W. GREGORY,
JOS. P. LIVERMORE.